United States Patent [19]

Sugiura et al.

[11] Patent Number: 4,972,320
[45] Date of Patent: Nov. 20, 1990

[54] MOTOR-DRIVEN POWER STEERING APPARATUS

[75] Inventors: Noburo Sugiura, Mito; Sadahiro Takahashi, Yokosuka; Masato Fukino, Yokohama, all of Japan

[73] Assignees: Hitachi, Ltd., Tokyo; Nissan Motor Company, Ltd., Yokohama, both of Japan

[21] Appl. No.: 101,655

[22] Filed: Sep. 28, 1987

[30] Foreign Application Priority Data

Sep. 29, 1986 [JP] Japan .................................. 61-228096

[51] Int. Cl.⁵ .............................................. B62D 5/04
[52] U.S. Cl. ............................... 364/424.05; 180/79.1; 180/142
[58] Field of Search ................... 364/424.05; 180/79.1, 180/141–143, 132; 74/388 PS

[56] References Cited

U.S. PATENT DOCUMENTS

| | | | |
|---|---|---|---|
| 4,660,671 | 4/1987 | Behr et al. | 180/142 |
| 4,703,821 | 11/1987 | Shimizu | 180/142 |
| 4,715,463 | 12/1987 | Shimizu | 180/142 |
| 4,765,426 | 8/1988 | Shimizu | 180/79.1 |

Primary Examiner—Gary Chin
Attorney, Agent, or Firm—Antonelli, Terry, Stout & Kraus

[57] ABSTRACT

Two torque sensors (201, 202) are arranged for detecting the steering force which is added to the motor-driven power steering apparatus. One torque sensor is selected by the command signal from the micro computer (80), for controlling the auxiliary steering force from the motor-driven actuator (5) by the command signal from the micro computer (80).

1 Claim, 19 Drawing Sheets

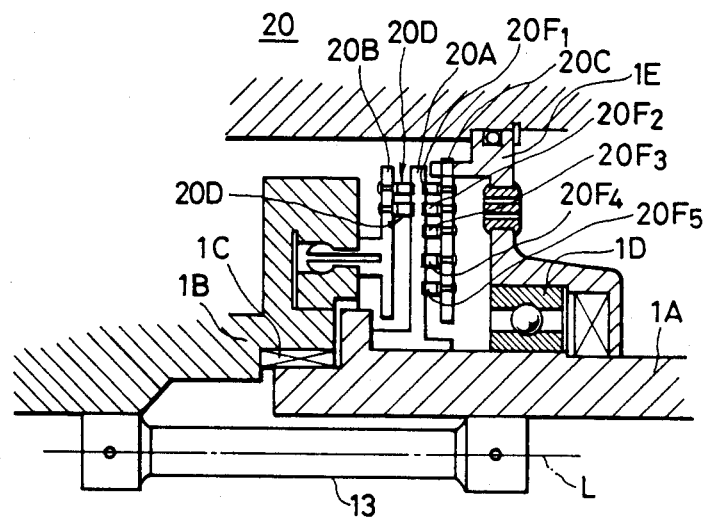
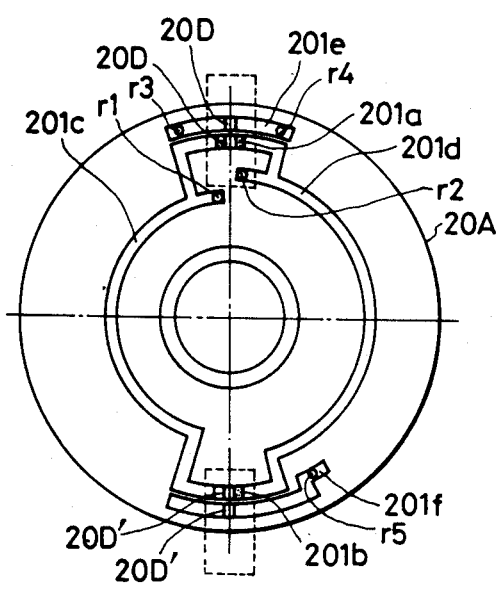
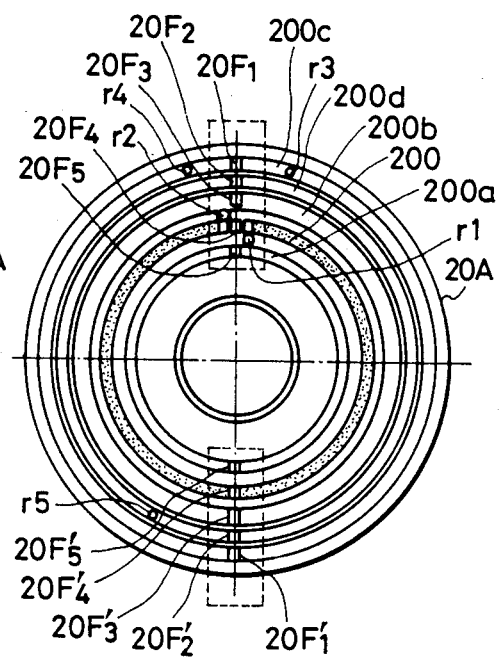

FIG. 5A
FIG. 5B
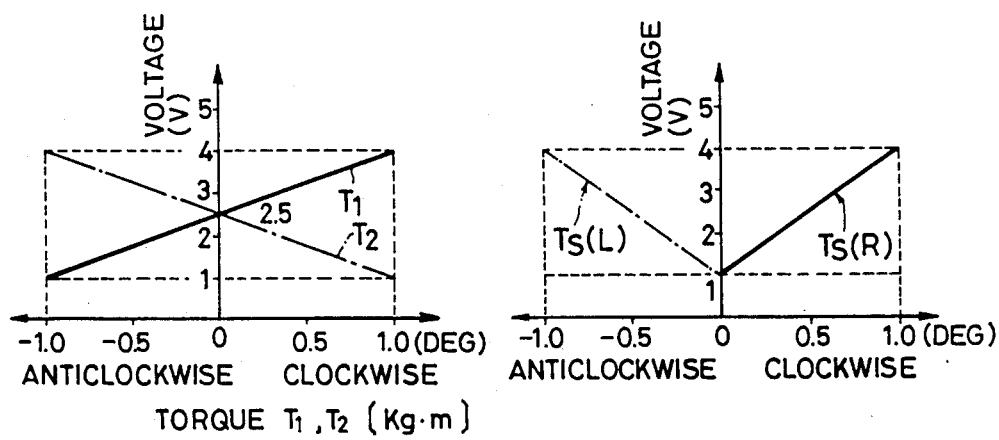
FIG. 6A
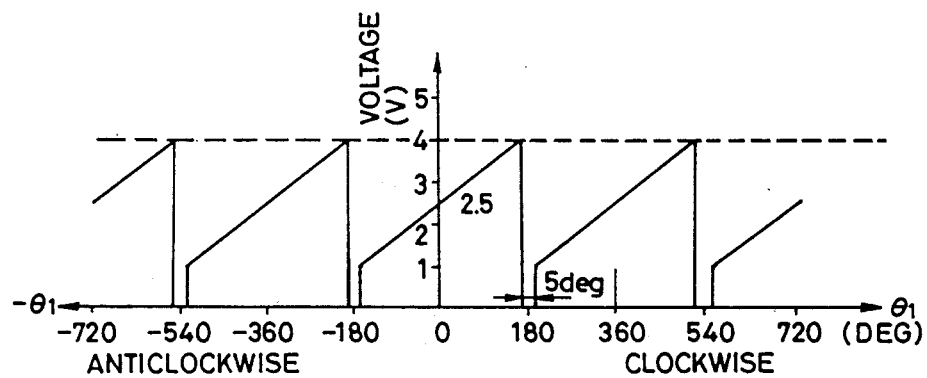
FIG. 6B
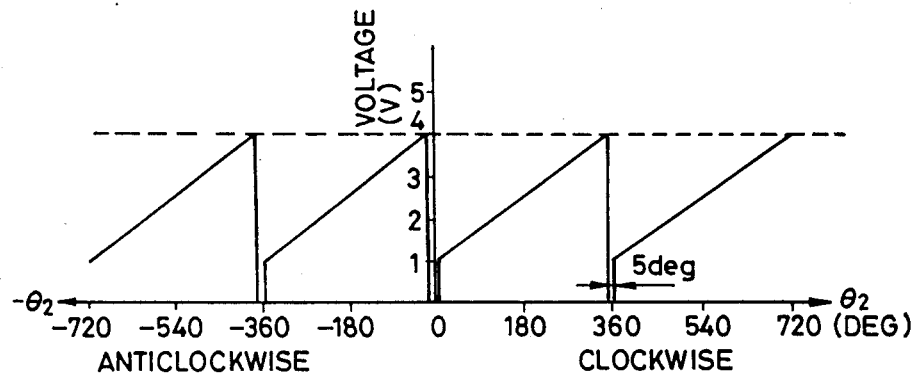

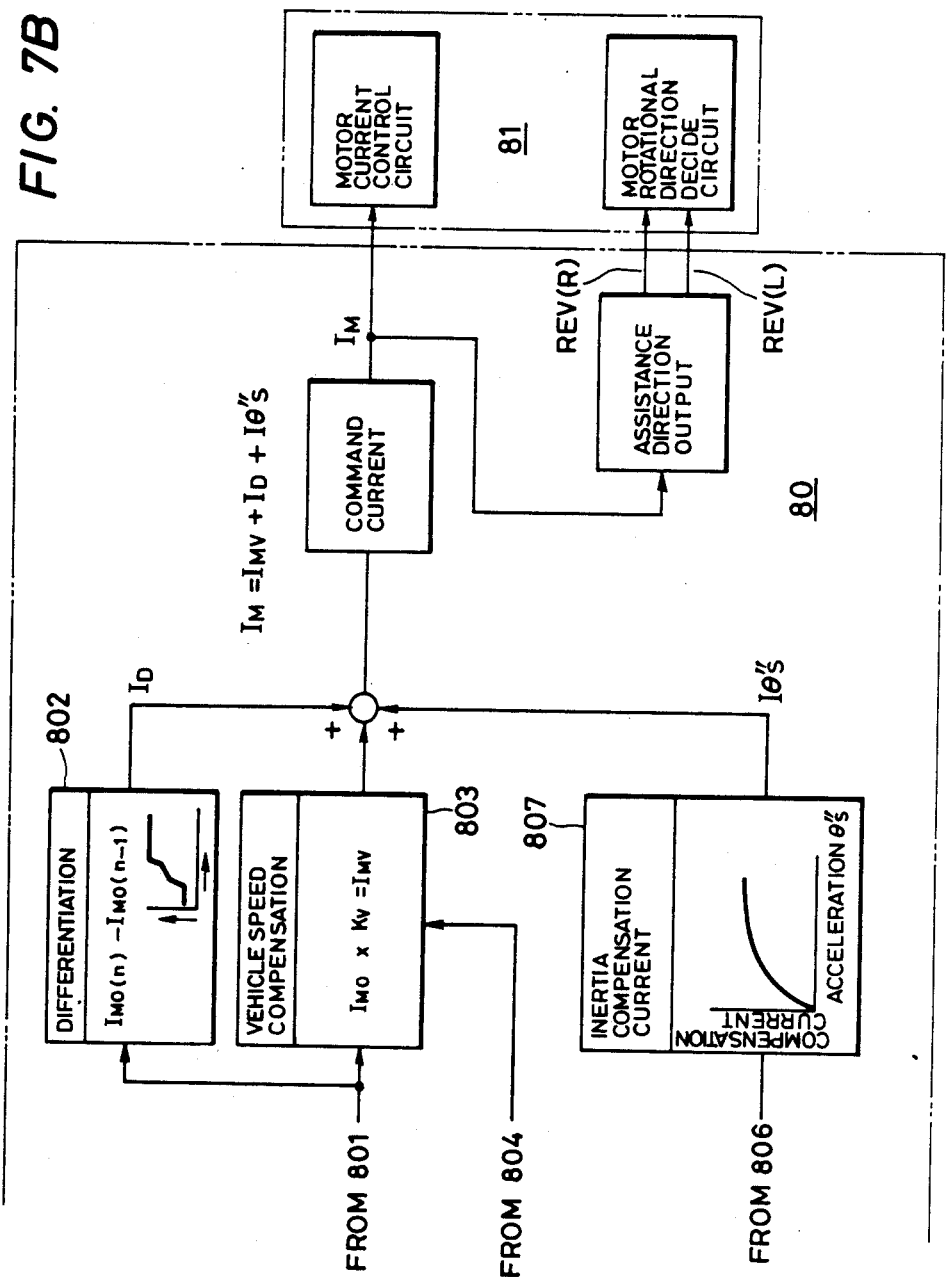

$$V_{\dot\theta} = V_{ref} - \frac{R_2}{\sqrt{R_1^2 + \left(\frac{1}{\omega C}\right)^2}} e^{j\alpha} V_\theta$$

$$\alpha = \tan^{-1}\left(\frac{1}{\omega R_1 C}\right)$$

F/G. 13
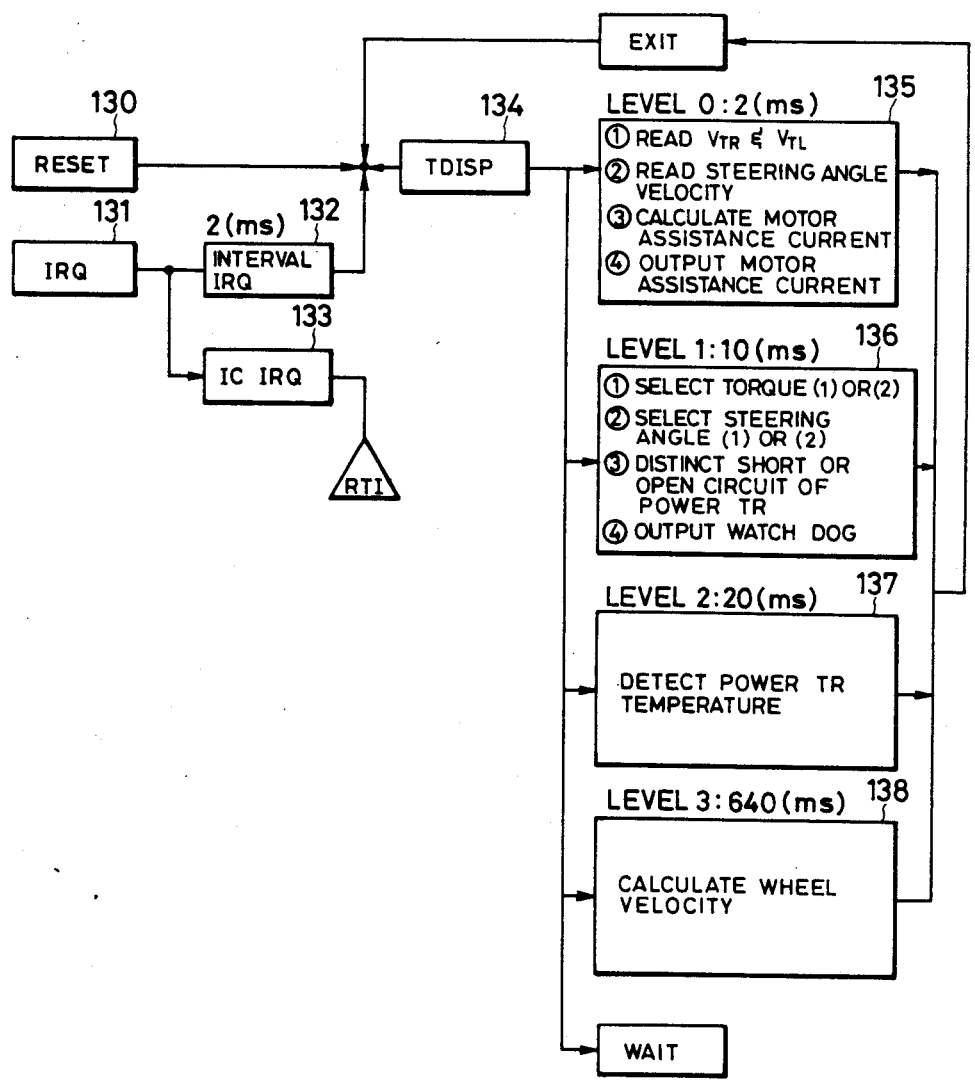

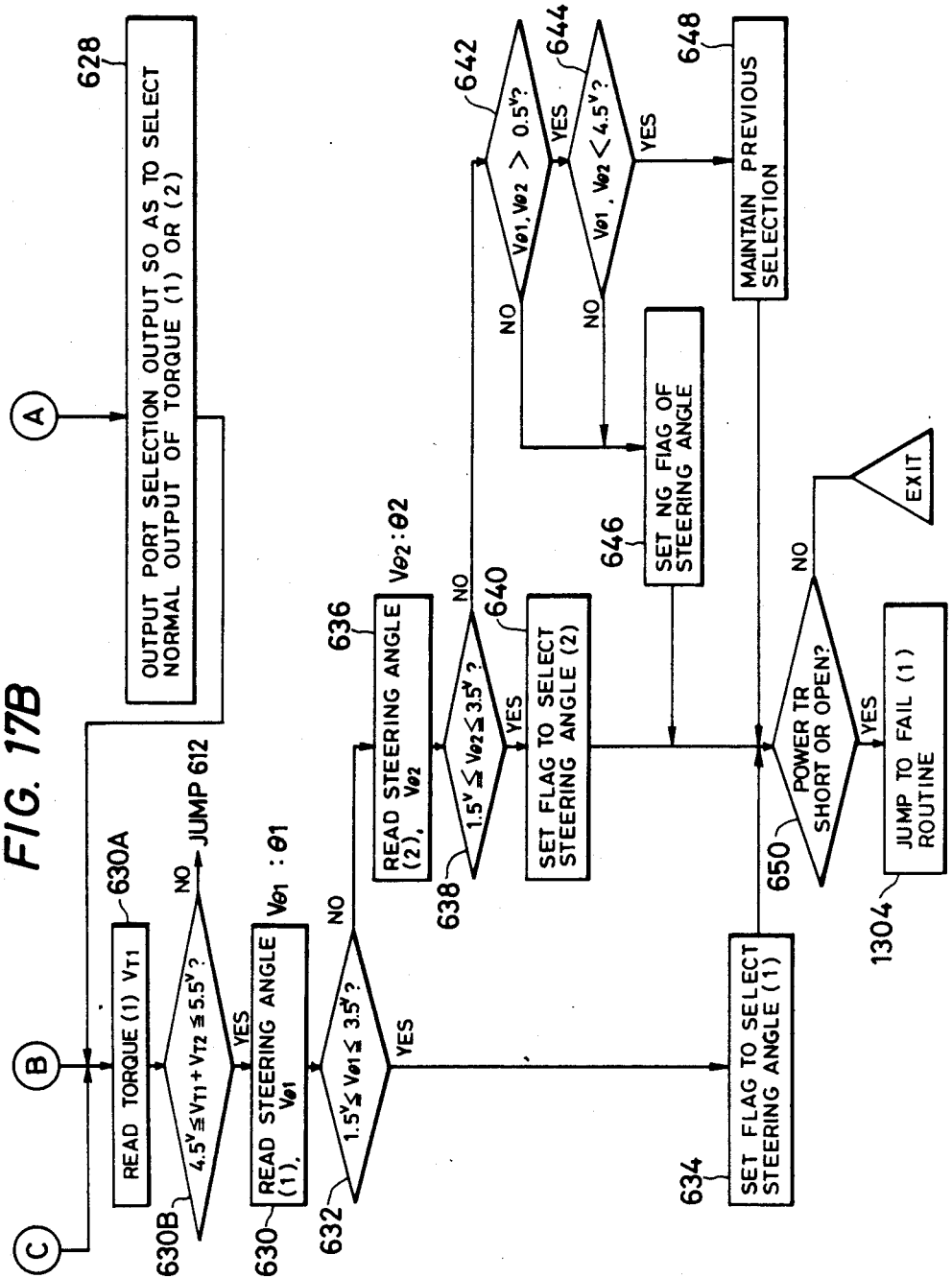

MOTOR-DRIVEN POWER STEERING APPARATUS

BACKGROUND OF THE INVENTION

The present invention relates to a motor-driven power steering apparatus using a motor-driven actuator for generating an auxiliary steering force, and more particularly to a motor-driven power steering apparatus which is suitable for automobiles.

As a power steering apparatus for automobiles, a conventional oil pressure type steering apparatus has been primarily used. Recently, a motor-driven power steering apparatus was proposed, since it controls various items more easily and it is a simpler piece of equipment within an automobile. For example, a motor-driven power steering apparatus is disclosed in FIGS. 2 and 4 of Japanese Patent Application Laid-Open No. 59-70257 laid open on Apr. 20, 1984.

Common construction of a motor-driven power steering apparatus is shown, for instance, by FIG. 18.

Referring to FIG. 18, 1 denotes a steering wheel. 2 denotes a torque sensor which is applied to a rotational axis of the handle 1. 3 denotes a steering gear (steering mechanism). 4 denotes a driven vehicle wheel. 5 denotes a DC motor for generating an auxiliary steering force. 6 denotes a clutch to cut the control force of the steering wheel 1. 7 denotes a reduction gear. 8 denotes a controller (control circuit). 9 and 10 denote switching transistors. 11 denotes a device for detecting current through the DC motor 5. 12 denotes a battery. 13 denotes an alternator. 14 and 15 are flywheel diodes. 50 denotes an armature. 51 and 52 are magnetic coils.

In operation of the steering wheel, an operating torque applied to the steering wheel 1 is detected by the torque sensor 2, and fed to the controller 8. The controller 8 supplies pulse output signals, which have different duty ratios corresponding to detected signals of the torque sensor 2, to the transistor 9 or 10 for controlling the motor 5 by chopper control. As a result the motor 5 transmits required torque to the driven or turning wheel 4 through the clutch 6 and the reduction gear 7 assists the steering force of the steering wheel 1.

The motor 5 is a series-wound D.C. motor having a field winding 51, for clockwise rotation an a field winding 52 for anticlockwise (or counterclockwise) rotation. A power source for driving the motor is a battery 12 mounted on an automobile and charged by the alternator 13.

With the foregoing construction, a steering angle of the driven or turning wheel 4 is imparted by a composite steering force of the steering gear 3 from the steering wheel 1 and an auxiliary steering force transmitted through the reduction gear 7 from the motor 5. Accordingly, the motor 5 generates the auxiliary steering torque corresponding to an operating torque T, and a power steering function can be obtained. At this time, the controller 8 introduces a signal $I_M$ representing a current I which flows to the motor 5 through the current detector 11, and a feedback control can be performed in such a manner that a predetermined current I corresponding to the torque T is correctly supplied to the motor 5.

However, we have found that such a conventional power steering apparatus has the disadvantage of not providing back-up when an abnormality is generated in the torque sensor, but of merely stopping the power steering function by cutting the clutch 6 from the motor 5.

As explained above, when an abnormality occurs in a torque sensor, the conventional power steering apparatus immediately stops functioning. Concerning this point, the conventional power steering apparatus has serious deficiencies in reliability.

SUMMARY OF THE INVENTION

An object of the present invention is to provide a motor-driven power steering apparatus which is able to control an auxiliary steering force while maintaining high reliability at all times.

According to the present invention, a detector for detecting a steering force which is applied to a power steering system from a steering wheel by using at least two torque sensors, and the power steering apparatus controls a motor-driven actuator based on an output signal of a selected one of the torque sensors; wherein an auxiliary steering force thereof can be controlled even with an abnormality in one of the torque sensors.

Since the motor-driven power steering apparatus can be controlled by a selected torque sensor among a number of the torque sensors, when one torque sensor is malfunctioning, it is still possible to control the auxiliary steering force continuously through the remaining torque sensor except the malfunctioning one, so that back-up for the power steering function can be obtained.

BRIEF DESCRIPTION OF THE DRAWINGS

FIG. 2 shows a sectional view of one embodiment of a steering sensor;

FIG. 3A shows a plan view of a torque sensor, and FIG. 3B shows a plan view of a steering angle sensor;

FIGS. 5A and 5B show characteristic diagrams of a torque sensor;

FIGS. 6A and 6B show characteristic diagrams of steering angle sensors;

FIGS. 7A and 7B show a logic block diagram for explaining the operation of the present invention;

FIG. 13 shows a diagram of a whole structure showing control function of the present invention;

FIGS. 17A and 17B show flow charts for explaining a processing by a task at level one.

DETAILED DESCRIPTION OF THE PREFERRED EMBODIMENTS

Figure 1A:
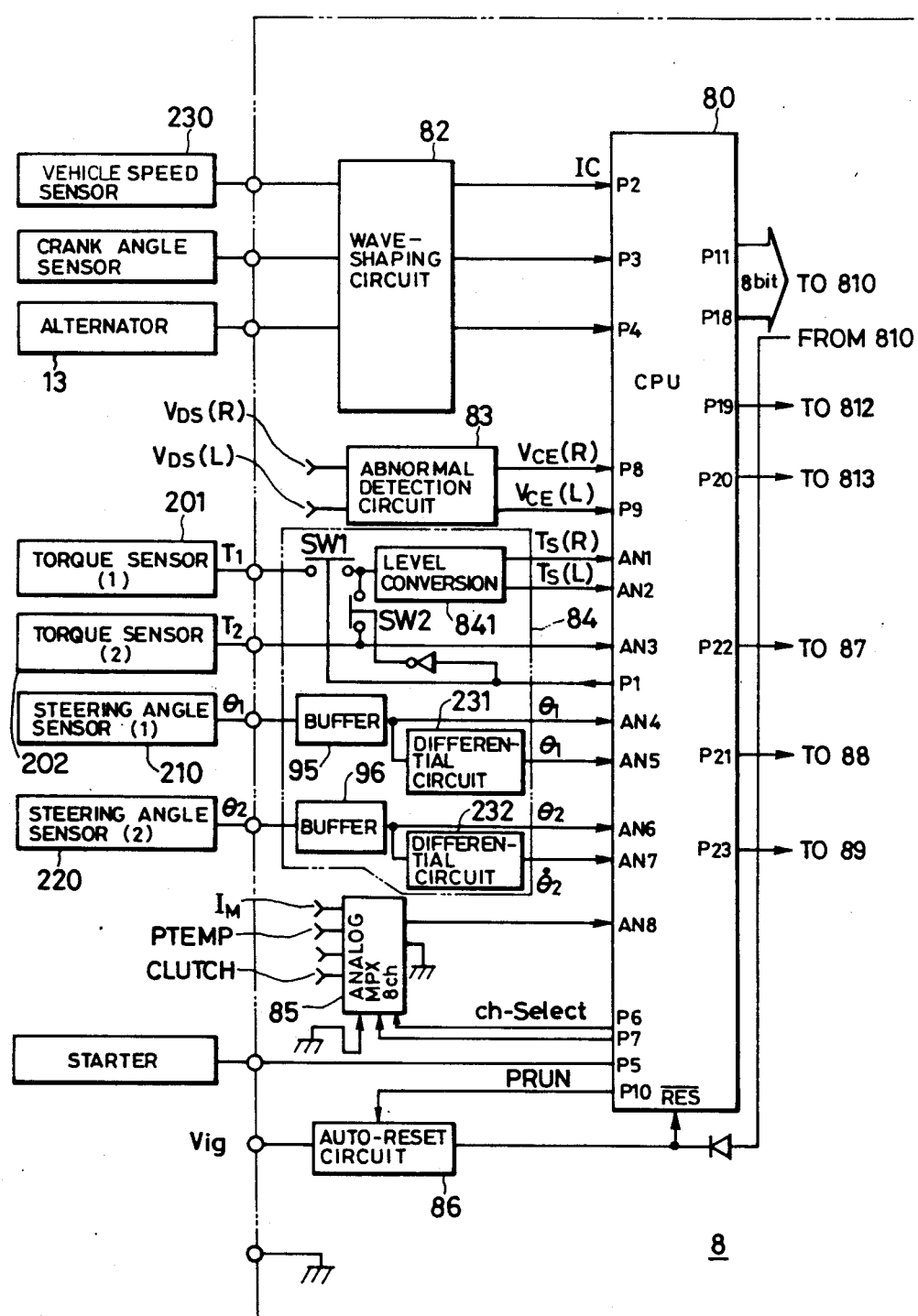
FIGs. 1A and 1B show the entire structure of one embodiment of a motor-driven power steering apparatus of the present invention.
Figure 1B:
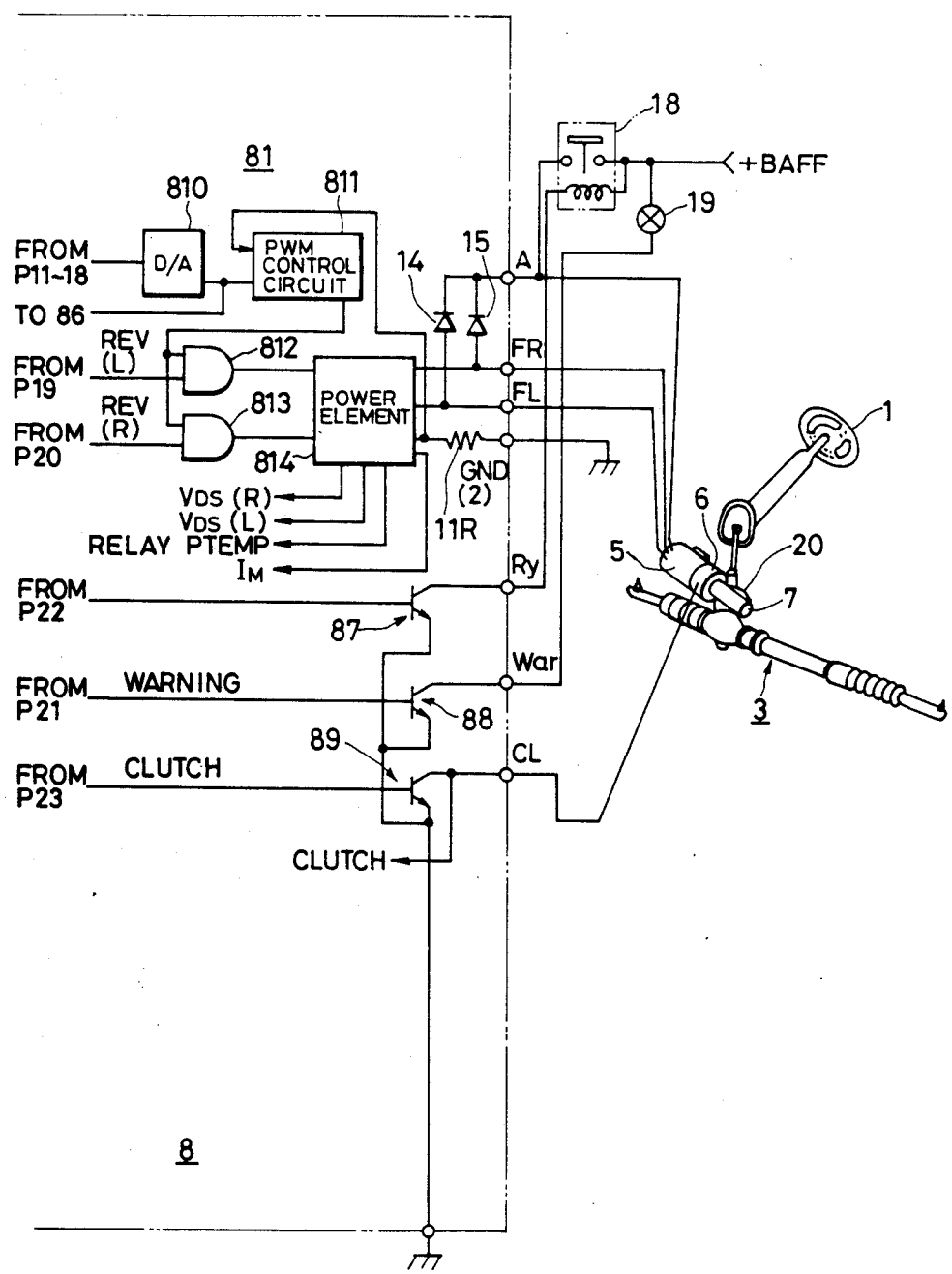
Figure 18:
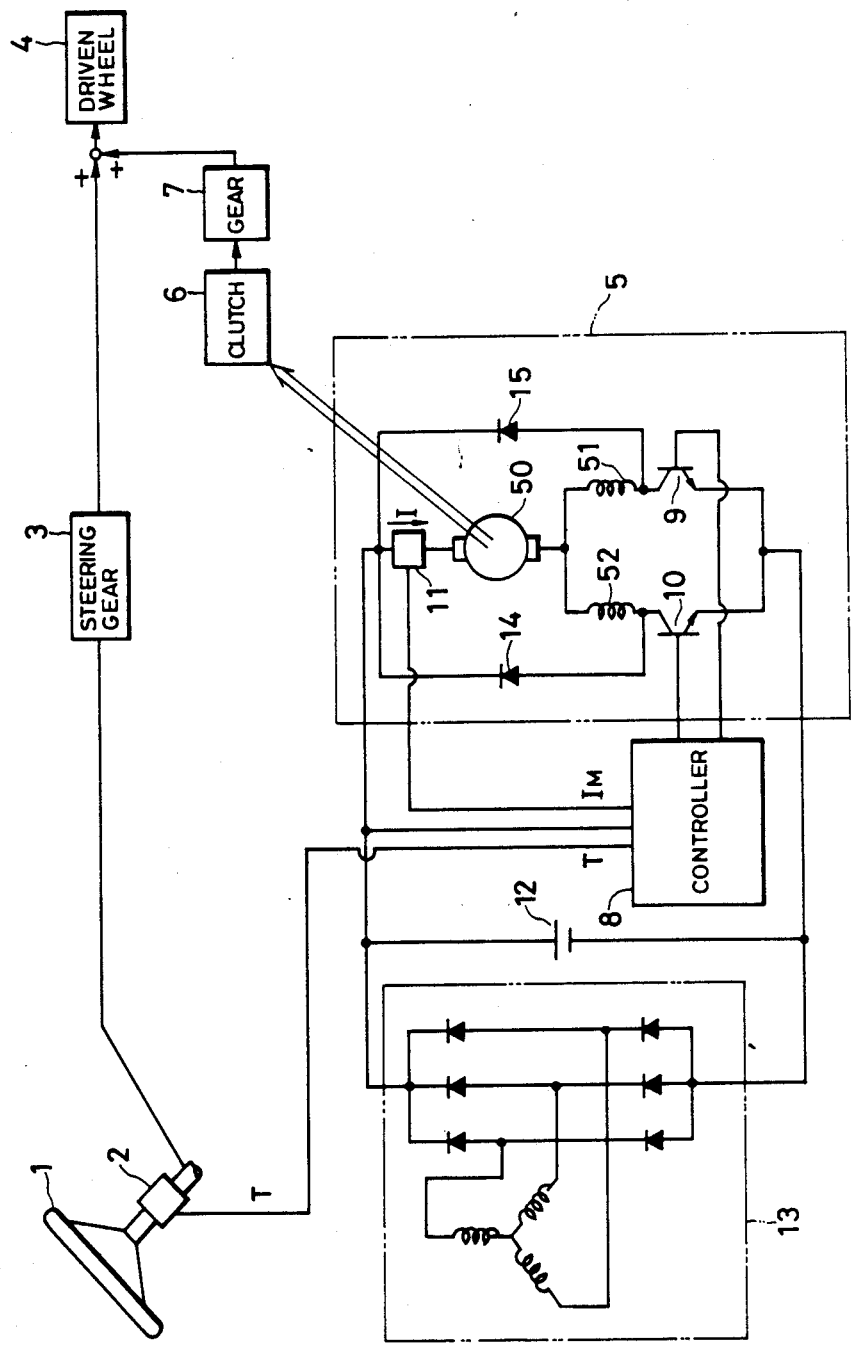
FIG. 18 shows a block diagram showing a conventional motor-driven power steering apparatus.

Referring to FIGS. 1A and 1B (hereinafter collectively referred to as FIG. 1), the motor-driven power steering apparatus thereof is different from that shown in FIG. 18 in that the former has a steering sensor 20 comprising two torque sensors 201, 202, and two steering angle sensors 210, 220, such that a control function by a controller 8 of the present invention is quite different from the controller of the prior art.

In the embodiment of FIG. 1, the steering angle sensors 210, 220 are used for obtaining an inertia compensation control. Since the motor 5 for obtaining the auxiliary steering force rotates at a relatively high speed, the inertia of the motor can not be neglected during acceleration or deceleration, and an additional force is needed for operating the steering wheel. Then, the power steering apparatus disclosed in FIG. 1 applies a control for cancelling the inertia or compensating for the inertia in a system in which the auxiliary steering force is provided by the motor 5.

Referring to FIG. 2, the steering sensor 20 uses a sliding resistor type transducer as the sensor element. 1A denotes an input axis to which the steering wheel 1 is applied. 1B is an output axis connected to a steering gear 3. 1A and 1B are constructed coaxially by a needle bearing 1C, rotate freely with respect to each other, and are held to a fixed portion 1E by a ball bearing 1D. The input axis 1A and the output axis 1B are elastically connected by a connection portion such as a torsion bar 13 through which the steering force (torque) is applied from the steering wheel 1 to the input axis 1A. When the steering force is sufficient to transmit to the output axis 1B, a torsion is generated to the torsion bar corresponding to the present steering force, so that an angular displacement occurs in proportion to the steering force T (torque) between the input axis 1A and the output axis 1B.

20A is a disk type insulating substrate applied to the input axis 1A. On the both surfaces of the insulating substrate 20A, a circuit pattern is formed as shown in FIGs. 3A and 3B. FIG. 3A is seen from the left side of FIG. 2, and FIG. 3B is seen from the right side of FIG. 2. On the surface of the left side of the substrate 20A, resistor patterns 201a, 201b which work as detecting elements of the torque sensors 201, 202 (FIG. 1); conductor patterns 201c, 201d for connecting the resistor patterns 201a, 201b to the power source; and conductor patterns 201e, 201f for forming the sliding face to the sliders of the resistor patterns 201a, 201b are formed as shown in FIG. 3A. On the surface of the right side of the substrate 20A, a resistor pattern 200 which works as detecting elements of the steering angle sensors 210, 220; conductor patterns 200a, 200b which work as slip rings for connecting the resistor pattern 200 to the power source; and conductor patterns 200c, 200d shown in FIG. 3B which work as slip rings for connecting the conductor patterns 201e, 201f to the outside; are formed as shown in FIG. 3B. In FIGS. 3A and 3B, r1, r2, r3, r4, and r5 are conductor rivets. The rivet r1 connects the conductor pattern 200a of the right surface and the conductor pattern 201c of the left surface. The rivet r2 connects the conductor pattern 200b of the right surface and the conductor pattern 201d of the left surface. The rivets r3-r4 connect the pattern 201e and 200c. The rivet r5 connects patterns 201f and 200d.

20B is an insulating substrate which is applied to the output axis 1B. On the surface of the insulating substrate 20B, a couple of brushes 20D contact and slide so as to bridge between the resistor pattern 201a on the left surface of the substrate 20A and the conductor pattern 201e; a couple of brushes 20D' arranged at an approximately symmetric position with respect to the central axis L of the input axis 1A, contact and slide so as to bridge between the resistor pattern 201b and the conductor pattern 201f.

20C is an insulating substrate which is attached to the fixed portion 1E. Five brushes $20F_1$-$20F_5$ are mounted on the substrate 20C, contact and slide on the resistor pattern 200 and each conductor pattern 200a, 200b, 200c, and 200d. Opposite to one brush $20F_4$ contacting and sliding on the resistor pattern 200 among the five brushes $20F_1'$-$20F_5'$, and at an approximately symmetric position with respect to the central axis L, one brush $20F_4'$ is arranged to contact and slide on the resistor pattern 200.

Figure 4A:
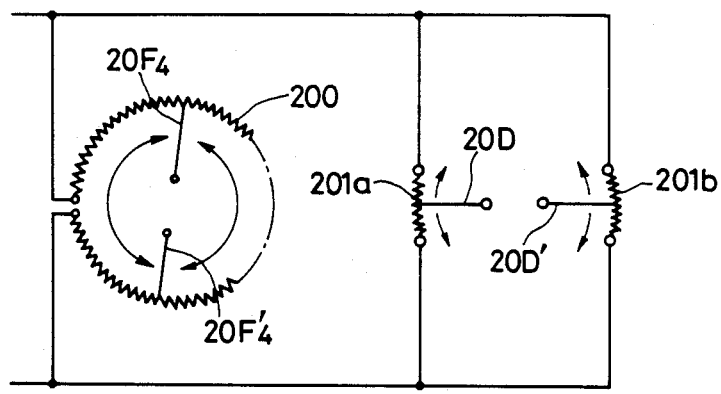
FIG. 4A shows a connection diagram of the steering sensor.

Accordingly, when the steering wheel 1 is operated and a torque is transmitted from the input axis 1A to the output axis 1B, an angular displacement occurs between the substrates 20A and 20B in proportion to the applied torque, so that the brushes 20D and 20E are displaced oppositely to each other as shown by an arrow in FIG. 4A, and the contacting positions of the resistor patterns 201a and 201b are changed. Then, the output voltage corresponding to the sliding position of the brush 201a and the output voltage corresponding to the sliding position of the brush 201b are obtained. These values of the output voltages are used for torque detecting values. Accompanying the revolution of the input axis 1A, the substrate 20A rotates against the fixed substrate 20C. As a result, the brushes $20F_4$, $20F_4'$ slide along the resistor pattern 200 as shown by an arrow in FIG. 4A. The output voltage corresponding to the sliding position of the brush $20F_4$ and the output voltage corresponding to the sliding position of the brush $20F_4'$ are obtained. These output voltages are used for steering angle detecting values. Incidentally, lead wires (not shown) are connected to the brushes 20D, 20D', $20F_1$-$20F_5$, and $20F_1'$-$20F_5'$.

Figure 4B:
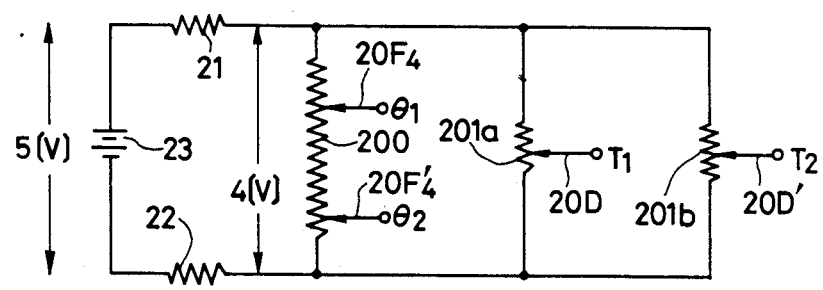
FIG. 4B shows an equivalent circuit of FIG. 4A.

The detection of the torques and the steering angles are carried out by the circuit which is connected to a DC power source of 5 volts through the outer resistors 21 and 22 shown in FIG. 4B. As a result, the torques $T_1$ and $T_2$ by the torque sensors 201 and 202 are detected, respectively, according to the characteristic diagram shown in FIG. 5A. The steering angles $\theta_1$ and $\theta_2$ by the steering angle sensors 210 and 220 are detected, respectively, according to the characteristic diagram shown in FIGS. 6A and 6B.

The torques $T_1$ and $T_2$ are level converted to expand their dynamic range and increase a resolution in an A/D conversion thereof. As shown in FIG. 5B, the torques $T_1$ and $T_2$ are separated into a clockwise torque $T_s(R)$ and a anticlockwise torque $T_s(L)$, and the clockwise torque $T_s(R)$ shown by a solid line and the anticlockwise torque $T_s(L)$ shown by a broken line are used for control signals having doubled dynamic ranges.

Turning back to FIG. 1, 80 denotes a micro computer controller, which encloses an A/D converter.

The motor-driven power steering apparatus is equipped with a vehicle speed sensor 230 by which the value of the auxiliary steering force can be changed, that is, so-called vehicle speed compensation can be taken place.

One of the torque signals $T_1$, $T_2$ detected by the two torque sensors 201, 202 is selected by the switches $SW_1$, $SW_2$. Normally, the torque signal $T_1$ is supplied to the micro computer 80. When the detection of the torque $T_1$ by the torque sensor 201 encounters trouble, the torque $T_2$ is supplied to the micro computer 80, as will be hereinafter explained.

Figure 7A:
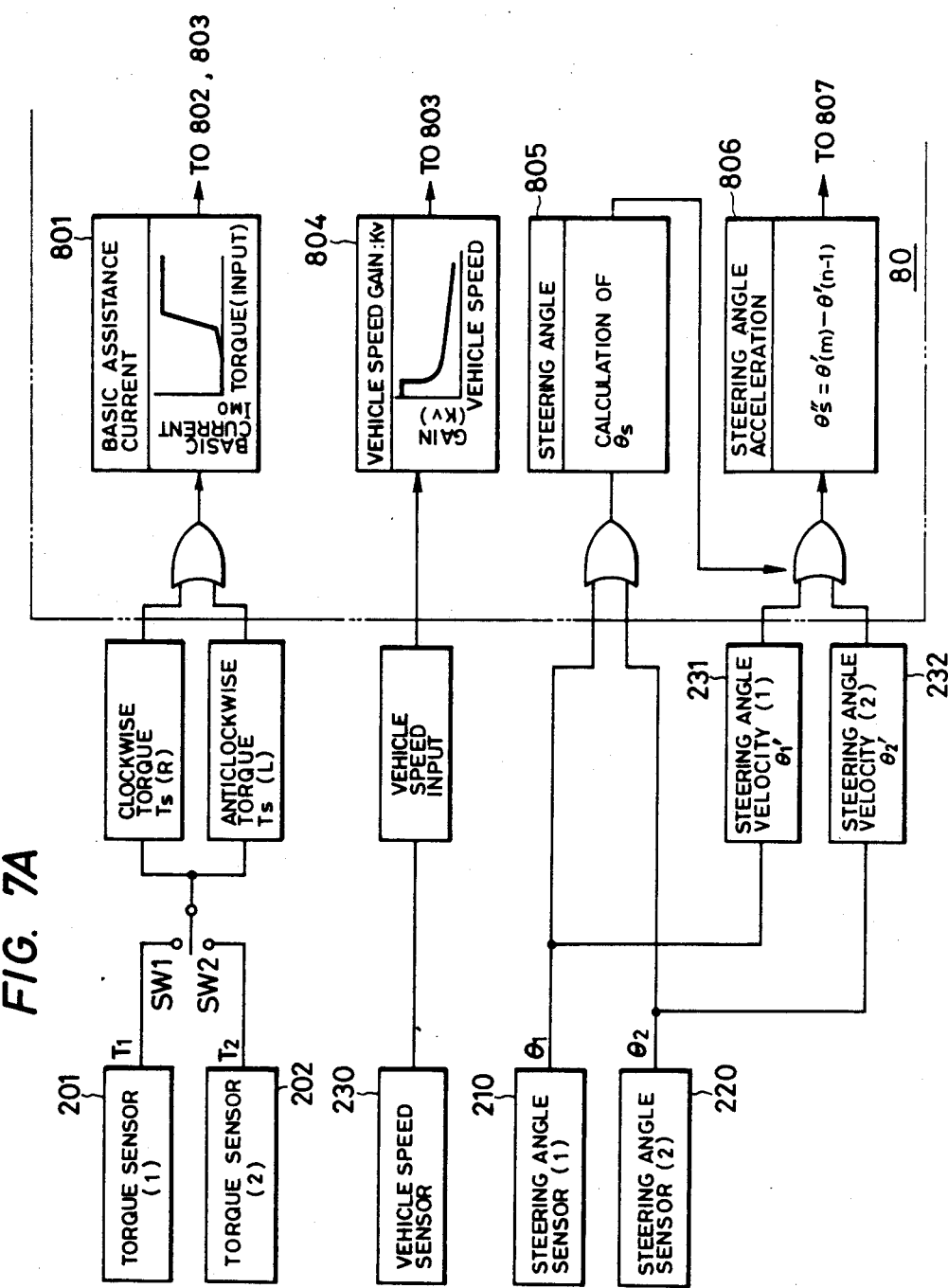

The signals $T_1$, $T_2$ of the torque sensors 201, 202 are input to the steering signal processing circuit 84. After either one of the signals $T_1$, $T_2$ is supplied and level converted to the signal $T_s(R)$ and $T_s(L)$ shown in FIG. 5B by the level converter 841, it is inverted by processor 801 shown in FIGS. 7A and 7B to a basic assistance current $I_{MO}$ corresponding to the torque T.

Next, the basic assistance current $I_{MO}$ is subjected to a differential processing 802, and a vehicle speed compensation processing 803, respectively.

First, the differential processor 802 produces a compensation current $I_D$ which is necessary for increasing responsiveness. The differential processing employs a digital method utilizing repetitive processing by the micro computer 80, and obtains a differential value $I_D$ by a subtraction between the value $I_{MO}(n)$ at present processing and the value $I_{MO}(n-1)$ at previous processing.

The vehicle speed compensation processor 803 utilizes a multiplication processing which multiplies a vehicle speed compensation coefficient $K_V$ which is 1.0 when the vehicle speed is low and is less than 1.0 when the vehicle speed rapidly increases, by the basic assistance current $I_{MO}$. The vehicle speed compensation coefficient $K_V$ at this time is calculated by the vehicle speed gain processor 804 based on the signal from the vehicle speed sensor 230.

Next, the signals $\theta_1$, and $\theta_2$ of two steering angle sensors 210 and 220 are introduced to the differential circuits 231 and 232, respectively. In the differential circuits 231, and 232, the signals $\theta_1$, and $\theta_2$ are differentiated in an analog fashion for conversion to the steering wheel angle velocities $\theta'_1$ and $\theta'_2$ which are supplied to the micro computer 80, further converted to a steering angle acceleration $\theta''_s$ by a digitalized differential processor 806, and converted to an inertia compensation current $I\theta''_s$ by processor 807.

The current $I_M$ supplied to the motor 5 for providing the auxiliary steering force, is obtained by adding these compensation values as follows:

$$I_M = I_{MV} + I_D + I\theta''_s$$

Concerning the steering angles $\theta_1$ and $\theta_2$ detected by the steering angle sensors 210 and 220, since the resistor pattern 200 is not arranged over 360° and has a partial slit as shown in FIG. 3B, the steering angles $\theta_1$ and $\theta_2$ have delays of 180° and non-detecting regions of about 5° for each 360° as shown in FIGS. 6A and 6B, respectively. For providing inertia compensation current $IO_s$ for determining the motor current $I_m$, the steering angle signals $\theta_1$, and $\theta_2$ are subjected to the steering angle processor 805 in which the signal $\theta_3$ within a predetermined voltage region, for example from 1.5 volts to 3.5 volts, is calculated, and supplied, along with either one of the steering angle velocities $\theta'_1$ and $\theta'_2$ corresponding to steering wheel angle variation, to the digitalized differential processor 806.

In FIG. 1, 81 denotes a motor control circuit. 82 is a wave-shaping circuit for obtaining a wave form which is necessary to input the signal from the vehicle speed sensor 230 to the micro computer 80. 83 is an abnormally detecting circuit of the power element 814 (corresponding to transistors 9 and 10 in FIG. 18). 84 denotes a processing circuit of the steering sensor signal. 85 is an analog multiplexer to change over and introduce one signal to the micro computer 80 from a number of signals (the current $I_M$ which flows to the motor 5, a signal PTEMP which denotes a temperature of a power element 814, and a clutch signal which is an operation signal of the clutch 6). 86 is an auto-reset circuit for resetting the micro computer 80 at a predetermined time. 87 is an output circuit for operating a power source relay 18. 88 is an output circuit for turning on an warning lamp 19. 89 is an output circuit for operating the clutch 6.

Figure 8A:
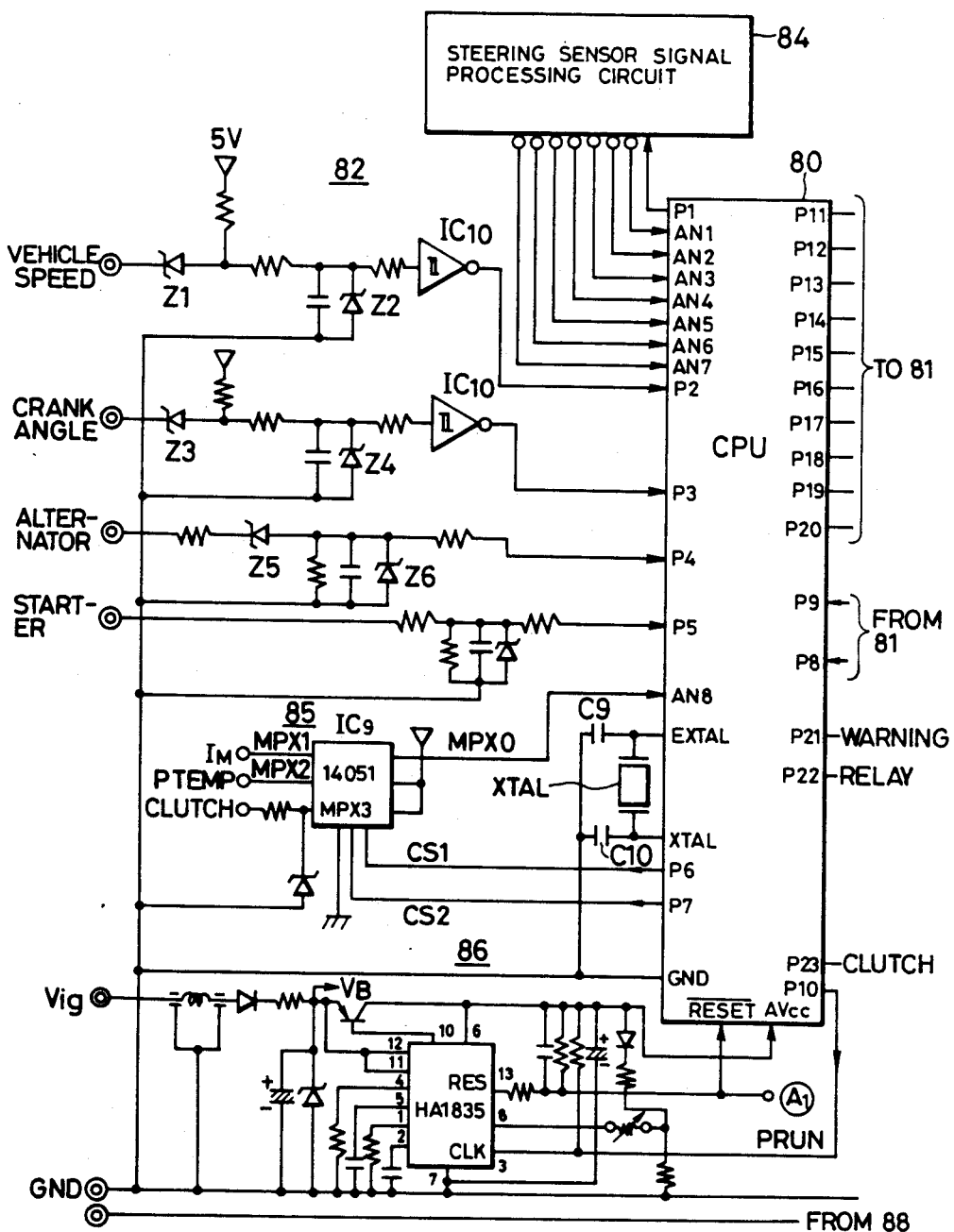
FIGS. 8A and 8B explain a peripheral circuit of one embodiment of the present invention.
Figure 8B:
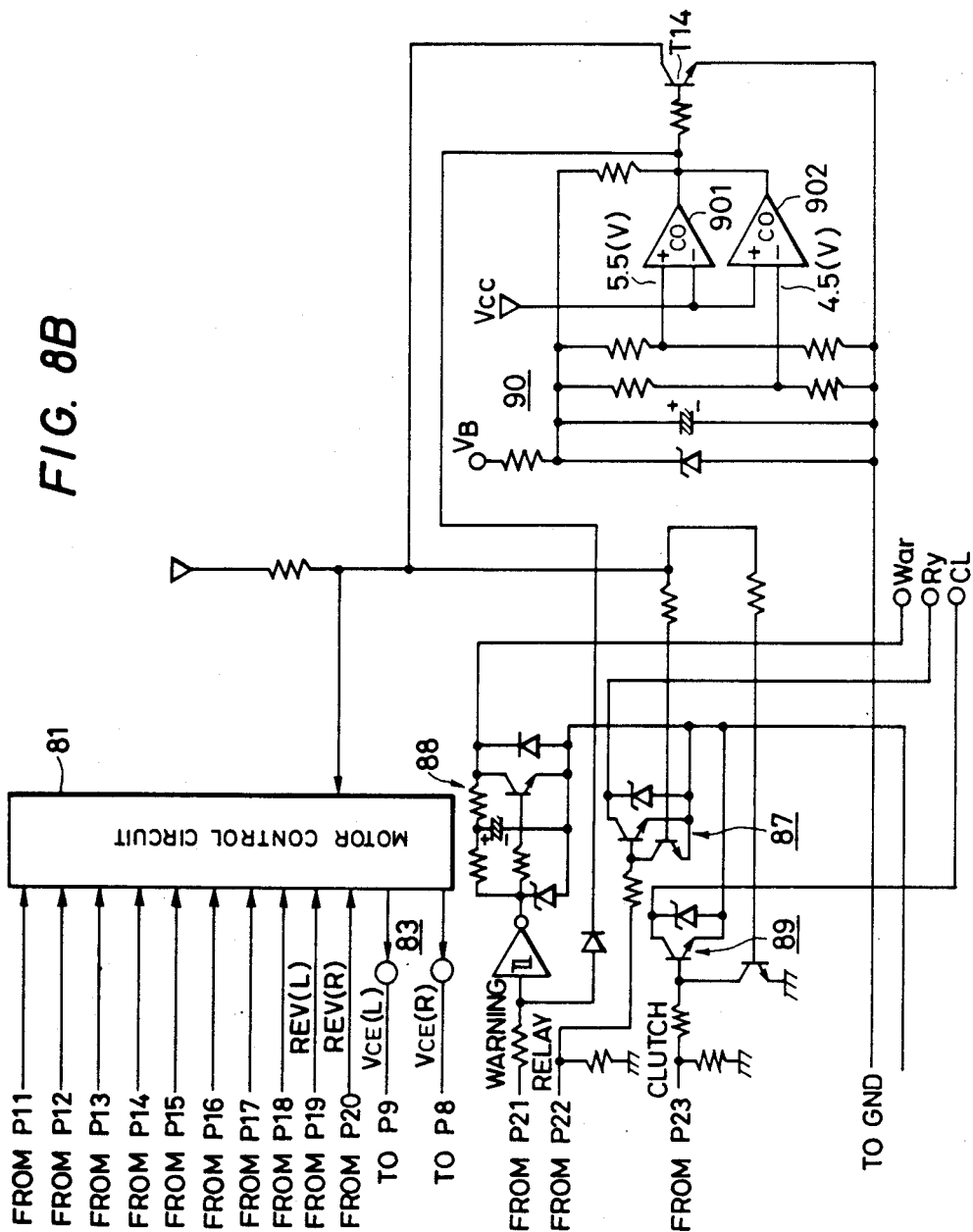

FIG. 8 describes in detail the wave-shaping circuit 82, the analog multiplexer 85, the auto-reset circuit 86, the output circuits 87, 89 and a power source abnormality detecting circuit 90.

The wave-shaping circuit 82 discloses Schmitt circuits shown by $IC_{10}$ and Zener diodes shown by $Z_1$-$Z_6$. The vehicle speed signal and a crank angle signal are wave-shaped by the Zener diodes and the Schmitt circuits, and the alternator signal is wave-shaped by the Zener diodes.

The analog multiplexer 85 uses $IC_9$ which is known by Type HD 14051 and selects one of the selection signals $CS_1$ and $CS_2$ from the output ports P6 and P7.

The auto-reset circuit 86 uses an IC which is known by Type HA 1835. When a rising signal $V_{ig}$ is generated by turning on an ignition switch of an automobile, and when a signal Program RUN which is generated intermittently from the output port P10 of the micro computer 80 is interrupted over a predetermined time, a signal RES is generated to reset the micro computer 80.

The power source abnormality detecting circuit 90 has two comparators 901, 902. When a power source $V_{cc}$ of the micro computer 80 is outside of a predetermined region, for example 5±0.5 volts, a transistor $T_{14}$ is turned off so that the clutch 6 and the power source relay are turned off and also the warning lamp 19 is turned on. In other words, when the power source voltage $V_{cc}$ of the micro computer 80 is outside a predetermined range, the proper operation of the micro computer 80 normal. At this time, the power steering apparatus is ceases functioning, and the cessation state is indicated while the collector voltage of the transistor $T_{14}$ is input to the motor control circuit 81. When the transistor $T_{14}$ is turned off, the motor current $I_M$ is zero.

The micro computer 80 receives the voltage of the alternator 13 and the signal generated by turning on the starter switch from the input ports P4 and P5 through a predetermined processing circuit. By the procedure explained above, when the output voltage of the alternator 13 is less than a predetermined voltage such as 5 volts, and when the starter is operating, the current $I_M$ of the motor 5 is reduced to zero so that malfunctioning of the power steering apparatus can be prevented.

Figure 9:
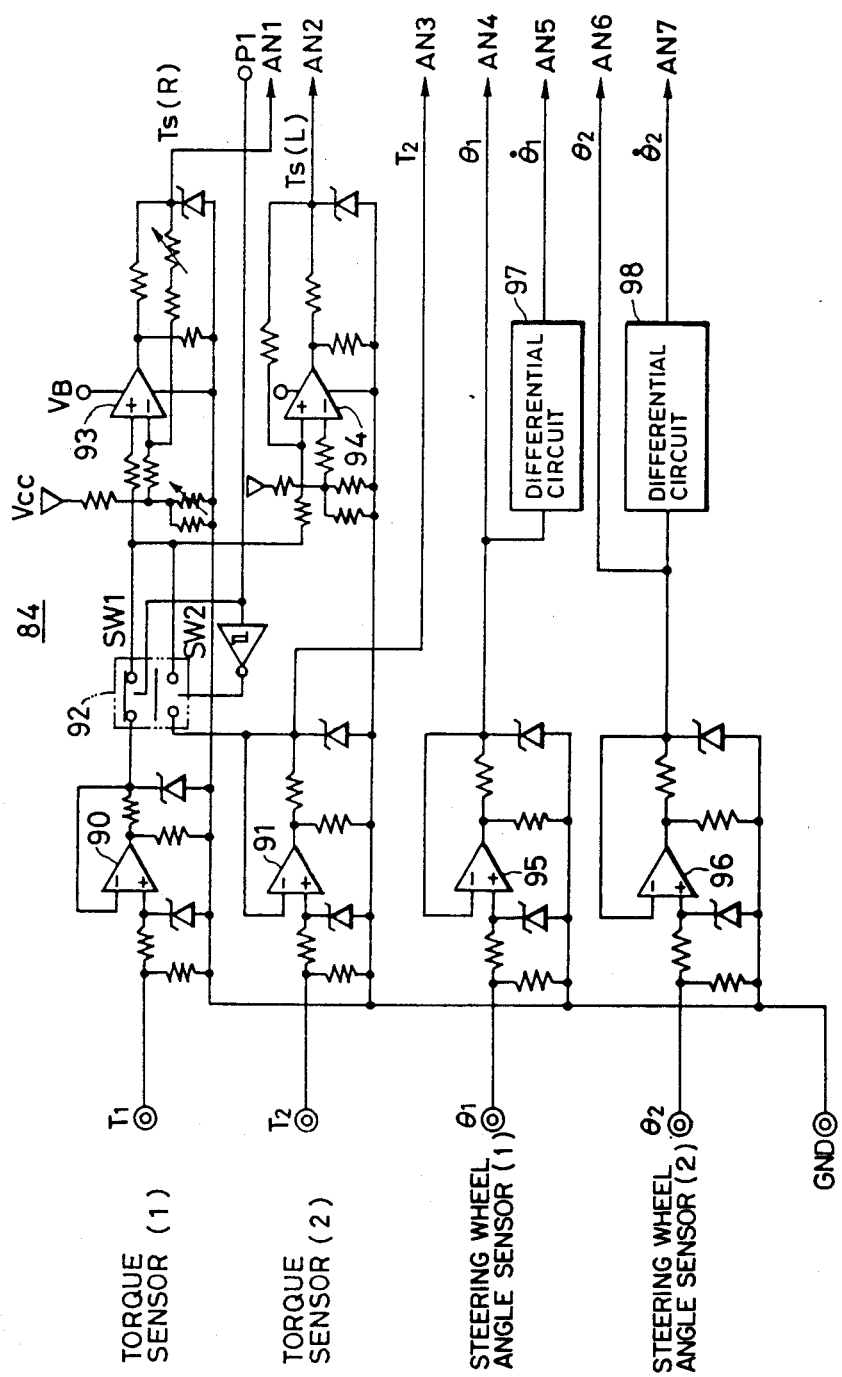
FIG. 9 shows a block diagram of a steering sensor signal processing circuit.

Referring to FIG. 9, the torque signals $T_1$ and $T_2$ are introduced through buffers comprising operation amplifiers 90, 91 which set gains thereof to 1. After the introduced signals are selected by an analog switch 92, the signals are processed by the level converter comprising operational amplifiers 93, 94 to supply the signals $T_s(R)$, and $T_s(L)$ to the analog inputs $AN_1$ and $AN_2$ of the micro computer 80.

After the steering wheel angle signals $\theta_1$ and $\theta_2$ are supplied to buffers comprising the operational amplifiers 95, 96, the signals are supplied to the micro computer 80 directly through the analog inputs $AN_4$ and $AN_6$. At the same time, the angles are processed by the differential circuits 231 and 232 to calculate the steering wheel in FIG. 1 and 97 and 98 in FIG. 9, respectively, angle velocity $\theta_1$, and $\theta_2$ so that the steering angle velocity is supplied to the micro computer 80 from the analog input $AN_5$ and $AN_7$.

Figure 10:
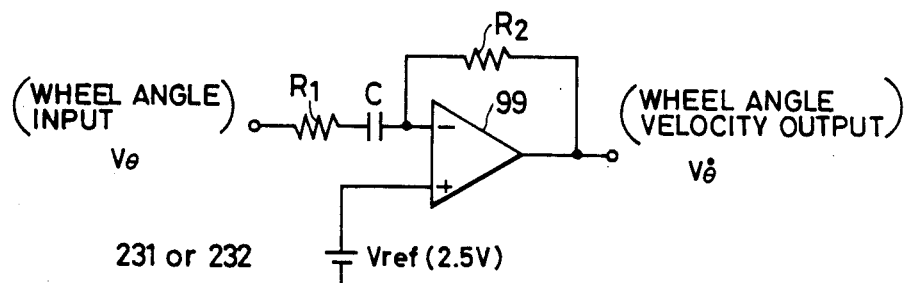
FIG. 10 shows a circuit diagram showing one example of a differential circuit.
Figure 11:
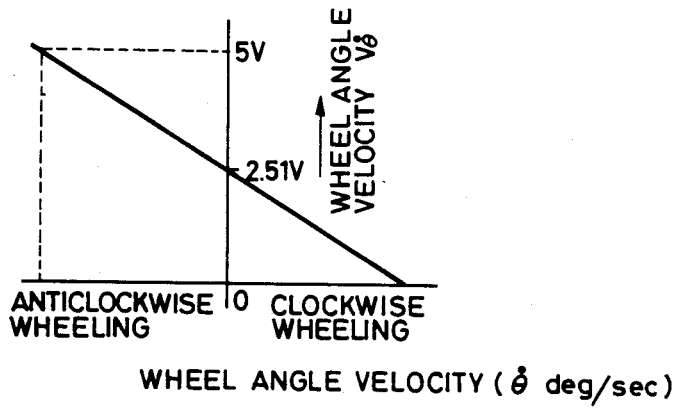
FIG. 11 shows a characteristic diagram of the differential circuit shown in FIG. 10.

Referring to FIG. 10, a (−) input terminal of the steering sensor signal processing circuit operational amplifier 99 is connected to a resistor $R_1$, a condenser C, and a feedback resistor $R_2$. The (+) input terminal of the amplifier 99 is connected to a reference voltage Vref of 2.5 volts. The characteristic of the differential circuit shown in FIG. 10 is shown by a formula therein. As a result, the characteristic of the output $V_\theta$ corresponding to the steering angle velocity $\theta$ is shown by FIG. 11.

As apparent from FIG. 1, the current command signal $I_M$ supplied to the motor 5 for supplying the auxiliary steering force is output as digital signals of 8 bits from the output ports P11-P18 of the micro computer 80. The current command signal is supplied to the D/A converter 810 of the motor control circuit 81, and converted to analog signals. The analog signals are converted to pulse signals for chopping control by a PWM control circuit 811. The pulse signals are input to the power element 814 through the AND gates 812, and 813 for controlling a revolutional direction of the motor 5. The power element supplies a clockwise signal RF or an anticlockwise signal FL to the motor 5.

Figure 12:
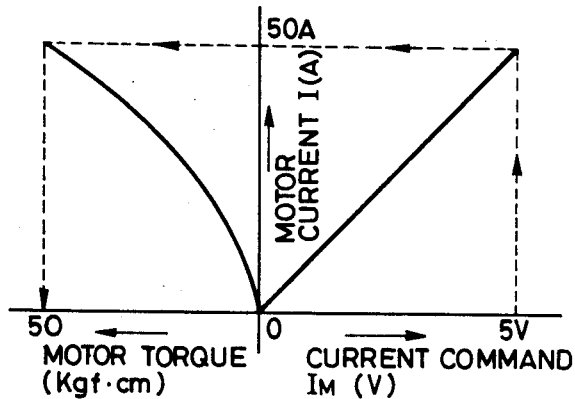
FIG. 12 shows a characteristic diagram of motor current and torque corresponding to current command signal.

At this time, the motor current I corresponding to the current command signal $I_M$ shows a linear characteristic as shown in FIG. 12. On the other hand, the generated torque of the motor 5 corresponding to the current I shows a non-linear characteristic as shown in left side of FIG. 12. Accordingly, for compensating the non-linear characteristic, the micro computer 80 has a translation table capability. A resistor 11R shown in FIG. 1 has the same function as the current detector 11 (FIG. 18). The resister 11R detects the current I which flows to the motor 5 and feeds back that current to the PWM control circuit 811.

FIG. 13 shows a distribution of control operations by the micro computer 80. Roughly classified, the distribution can be divided into reset processing 130 which is carried out when a key switch is turned on, and interrupt processing 131. Further, the interrupt processing 131 is divided into interval interruption 132 which is activated each 2 milliseconds by a timer, and IC (input capture) interruption 133.

Figure 14:
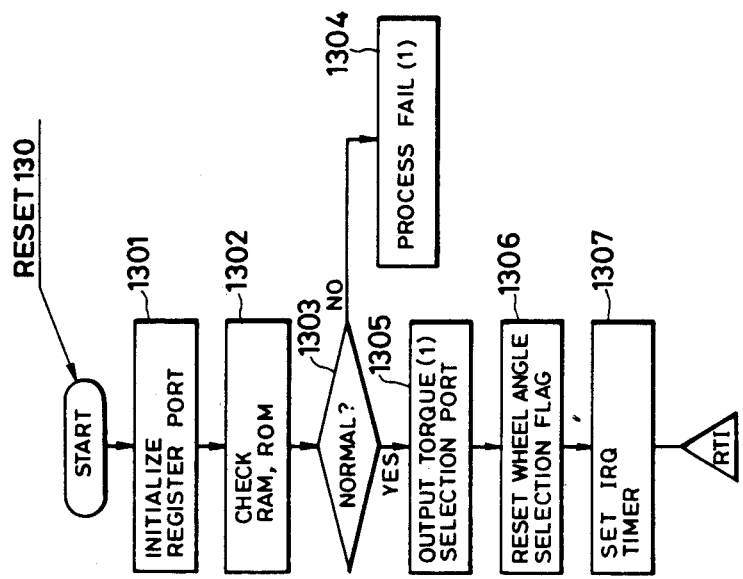
FIG. 14 shows a flow chart of a reset processing.

The reset processing 130 is operated, as explained above, when the key switch is turned on, the auto-reset circuit 86 is operated by the signal $V_{ig}$ rise of the key switch operation, and the signal of the auto-reset circuit 86 is input to the reset input of the micro computer 80. As shown in FIG. 14 each resister and port within the micro computer is first initialized at step 1301. At step 1302, RAM and ROM are checked. The check of RAM is carried out by inputting a value of a certain number thereto, and certifying whether the result of adding the output of the value becomes a predetermined value. The check of ROM is carried out by certifying whether the result of adding all the outputs becomes a predetermined value, by a so-called by sum check.

Figure 15:
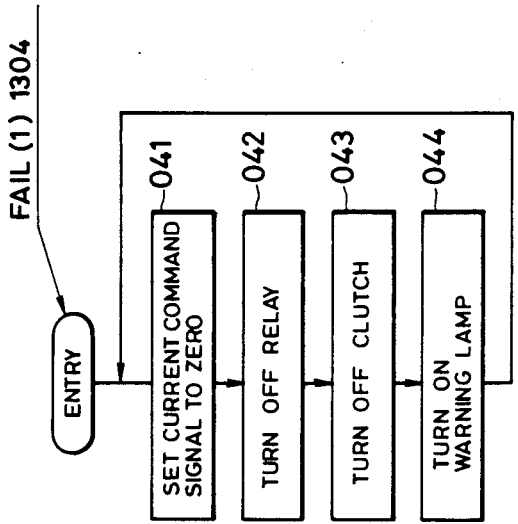
FIG. 15 shows a flow chart of a fail processing.

The result of the step 1302 is judged at next step 1303. When the result of the step 1303 is NO, the processing of step 1303 flows to step 1304 of fail (trouble) processing. When the result of the step 1303 is YES, the processing of the step 1303 flows to step 1305 in which the switch $SW_1$ (FIG. 1) is closed by output from the port P1, whereby the torque $T_1$ is selected. At next step 1306, a steering angle selection flag (explained later) is reset, and lastly processing is finished by starting a timer of the interruption processing 132 (FIG. 13) at step 1307. When the result of the step 1303 is NO, the processing of the step 1303 flows to a fail processing of step 1304. The step 1304 discloses a flow chart shown by FIG. 15. At step 041, the motor command signal $I_M$ is set to zero. At next steps 042, 043, and 044, the signal to the output circuits 87, 88, and 89 are controlled and the relay 18 is turned off to switch off the current of the motor 5, the clutch 6 is turned off to separate the rotational axis of the motor 5 from the steering gear 3, and the warning lamp 19 is turned on.

Accordingly, after the key switch is turned on, the result of the step 1303 becomes YES by practicing the reset processing 130, the timer set is carried out by step 1307, and the interrupt processing 131 is carried out.

The interrupt processing 131 is further divided, as previously noted, into the interval capture interruption processing 133. The IC interruption processing 133 is a processing started at each time when the vehicle speed pulse is input, and a counter which is set inside thereof is counted up at each time when both edges of the leading edge and the trailing edge of the vehicle speed pulse are generated, as explained above. As a result, the vehicle speed V is obtained by reading the counting value of the counter and clearing it at a constant period (for instance 640 milliseconds by a vehicle speed processing hereunder explained. Incidentally, the frequency [HZ] of the vehicle speed pulse from the vehicle speed sensor 230 is, for instance according to JIS (Japanese Industrial Standard) D 5601, is set at $f=0.354 \times V[km/h]$. Accordingly, for instance, when the vehicle velocity V is 10 [km/h], the frequency is 284 milliseconds, and the starting period of the IC interruption processing 133 is 284 milliseconds.

Next, referring back to FIG. 13, the timer which is set by the step 1307 relating to the reset processing 130, activates the interval interruption processing 132.

When the interval interrupt processing 132 is started, a task dispatcher processing 134 is activated at each time, and the interruption starting at each time is judged as to whether the interruption starting corresponds to a task of level zero to be started at each 2 milliseconds, a task of level one to be started at each 10 milliseconds, a task of level two to be started at each 20 milliseconds, or a task of level three to be started at each 640 milliseconds. Based on the judgment, either one of the task 135 of the level zero, the task 136 of the level 1, the task 137 of the level 2, or the task 138 of the level 3 is started.

Figure 16A:
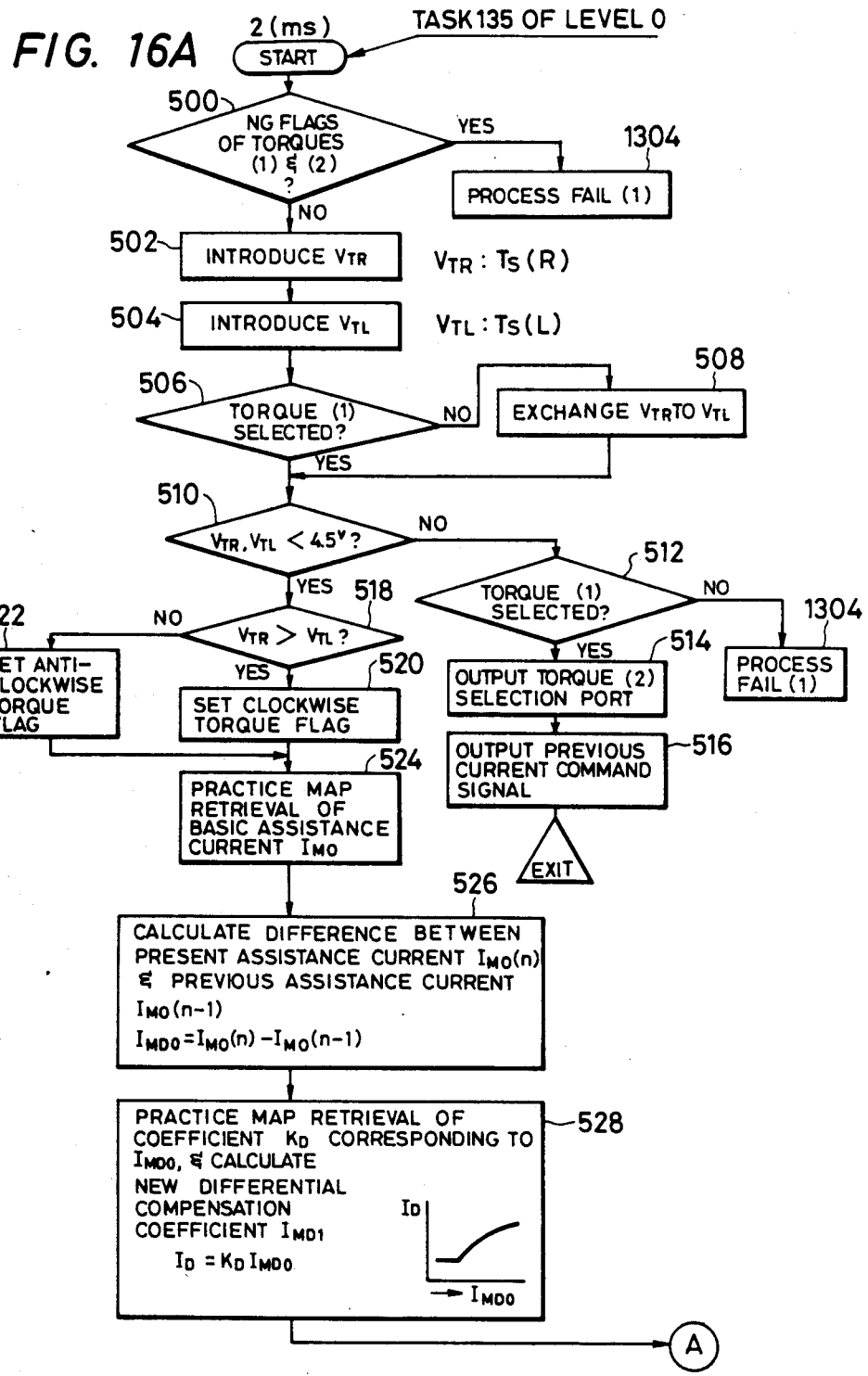
FIGS. 16A, 16B, and 16C show flow charts for explaining a processing by a task at level zero.
Figure 16B:
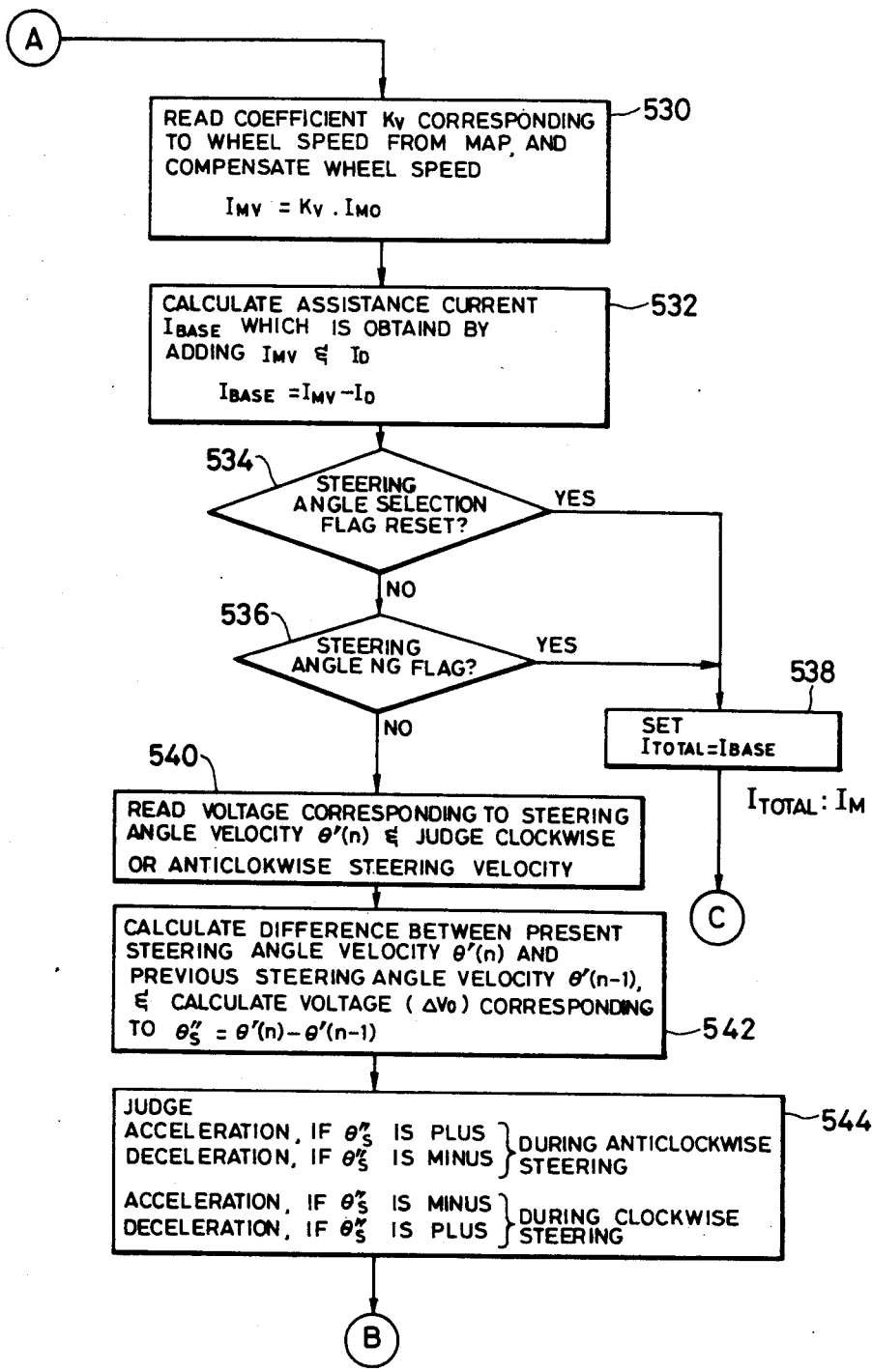
Figure 16C:
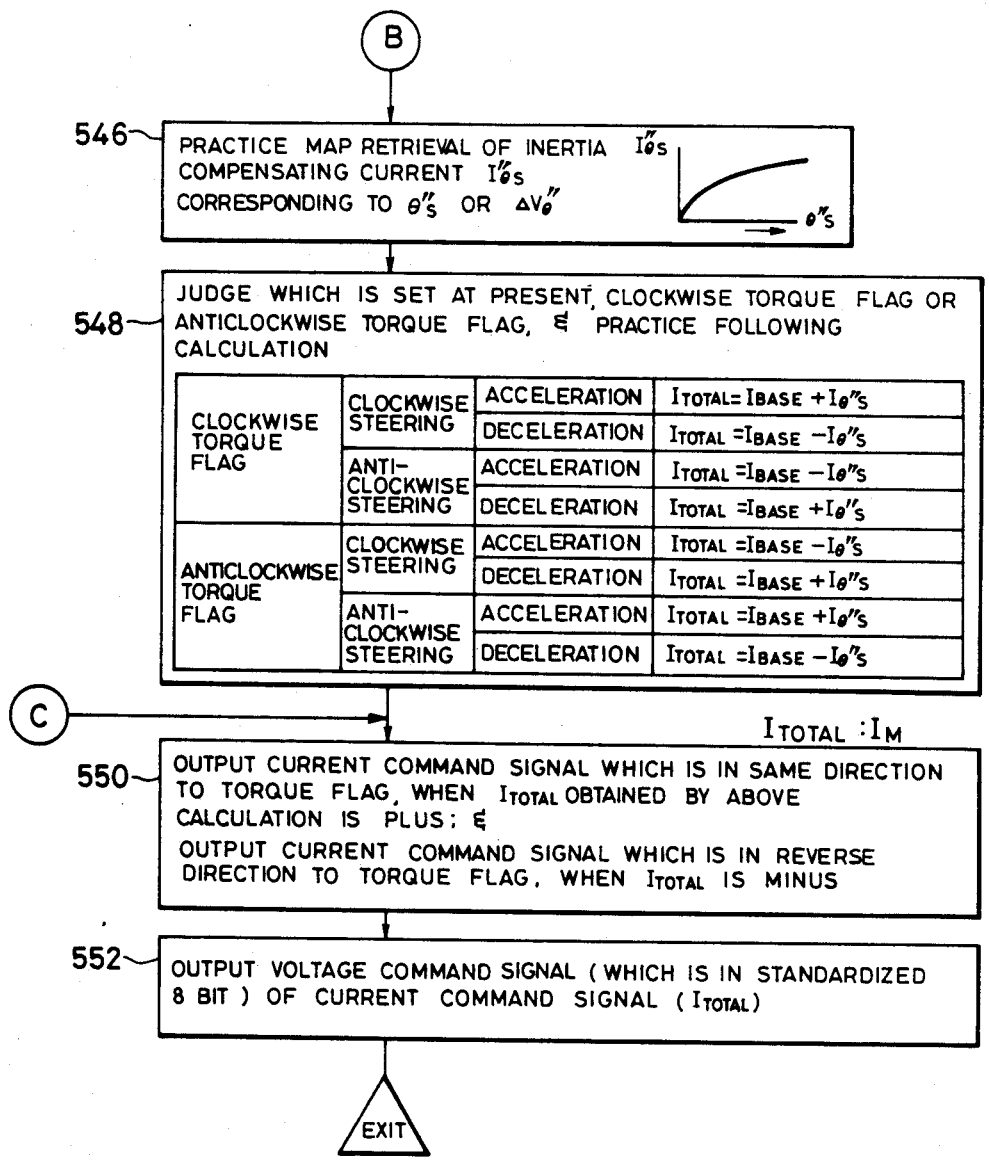

FIGS. 16A, 16B, and 16C disclose the task 135 of the level zero. When the task 135 is started, NG flags of the torques (1) and (2) are checked as to whether they are or are not set by step 500. When the result of the step 500 is YES, the processing of the step 500 flows to the step 1304 of the fail processing as explained at FIG. 15 because a normal maintenance of the power steering function is impossible when the torques (1) and (2) are in the NG state.

At steps 502 and 504 the analog signals $T_s(R)$, and $T_s(L)$ are introduced through the analog ports $AN_1$ and $AN_2$, respectively, from the steering sensor signal processing circuit 84 (FIG. 9). $V_{TR}$ denotes the signal $T_s(R)$, and $V_{TL}$ denotes the signal $T_s(L)$.

At the next step 506, it is judged whether the torque sensor (1) is or is not selected. When the result of the step 506 is NO, the values of $V_{TR}$ and $V_{TL}$ are exchanged at step 508 because, as already explained in conjunction with FIGS. 2-5, in the torque sensors (1) and (2), the polarity of the counterclockwise signal is reversed with respect to the clockwise signal.

At step 510, it is judged whether both signals $V_{TR}$ and $V_{TL}$ are less than 4.5 V. When the result of the step 510 is NO, the processing of the step 510 flows to step 512. At the step 512, it is judged again whether the torque sensor (1) is or is not selected. When the result of the step 512 is NO, namely, when the torque sensor (2) is selected at this time, the step jumps immediately to the step 1304 of the fail processing of FIG. 14. As already explained in conjunction with FIGS. 4 and 5, it is assumed that the outputs of the torque sensors are to be 4 volts maximum, for the sensors consider the outputs normal. Accordingly, when the result of the step 510 is NO, it means that the selected torque sensor is malfunctioning. On the other hand, by the step 1305 of the reset processing in FIG. 14, the embodiment of the present invention first selects the torque sensor (1). Accordingly, when the result of the step 512 is NO, it means that the torque sensor (1) is already encountering trouble and there the torque sensor (2) is selected. Then, when the result of the step 512 is NO, it denotes that both torque sensors (1) and (2) are abnormal, and the apparatus proceeds immediately to the fail processing step 1304.

Next, when the result of the step 512 is YES, since it means that still some margin for selecting the torque sensor (2) remains, the processing is finished by reversing the signal of the output port P1 at next step 514, selecting the torque (2) by turning on the switch $SW_2$, and using the current command signal again which was calculated at previous processing (before 2 milliseconds) at next step 516.

On the other hand, when the selected torque sensor has no trouble, the result of the step 510 is YES. At this time, it is judged whether the signal of the torque sensor is the clockwise signal or the anticlockwise signal. According to the result of step 518, the processing in steps 520 and 522 is carried out. A decision as to whether it is a clockwise signal or an anticlockwise signal is carried out by comparing the magnitude of the signals $V_{TR}$ and $V_{TL}$. This will be easily understood by referring to the characteristic of the signals $V_{TR}$ ($=T_s(R)$) and $V_{TL}$ ($=T_s(L)$) explained in FIG. 5B.

At next step 524, the basic assistance current $I_{MO}$ is calculated based on the torque $V_{TR}$ or $V_{TL}$. The processing of the step 524 corresponds to the processing 801 in FIG. 7, and is carried out by practicing a map retrieval.

Next steps 526 and 528 correspond to the processing 802 shown in FIG. 7. These steps are carried out by differentiating the basic assistance current in digital form, and by setting the differential compensation current $I_D$ from the map retrieval.

Next step 530 corresponds to the processors 803 and 804 in FIG. 7. The step 530 is carried out by practicing a map retrieval corresponding to the wheel velocity obtained by the task 138 of level three in FIG. 13, reading the coefficient $K_V$ representing gain, and setting the wheel speed compensation current $I_{MV}$ by the coefficient.

At next step 532, the assistance current $I_{BASE}$, which becomes a basic control current for the auxiliary power steering force, is calculated.

After, the assistance current $I_{BASE}$ is obtained, it is determined whether the introduction of the steering angle signal is possible at next steps 534 and 536. When the steering angle selection flag is reset, or when the steering angle NG flag is set, the processing of step 534 flows to step 538, so that the assistance current $I_{BASE}$ is set as the current $I_M$ ($=I_{TOTAL}$) to be supplied to the motor 5.

On the other hand, when the signal of the steering angle sensor has no trouble, namely, when the results of both steps 534 and 536 are NO, the processing of the steps flow to the inertia compensation processing by steps 540-548, set the inertia compensation current $I\theta''_s$ corresponding to the steering angle acceleration $\theta''_s$, and calculate finally the necessary total assistance current $I_{TOTAL}$ ($=I_M$) by adding the current $I\theta''_s$ and the assistance current $I_{BASE}$. These steps 540-548 correspond to the processings 805-807 in FIG. 7.

After the assistance current $I_M$ is obtained by the steps 538 or the step 548, the direction to be assisted is determined by step 550, and either one directional commanding signal REV(R) or REV(L) from the output port P19 or P20 (FIGS. 1 and 8) is output. At next step 552, the data having 8 bits representing final assistance current $I_M$ is generated at the output ports P11-P18, and finishes the task of the level zero shown in FIGS. 6A and 6B.

Figure 17A:
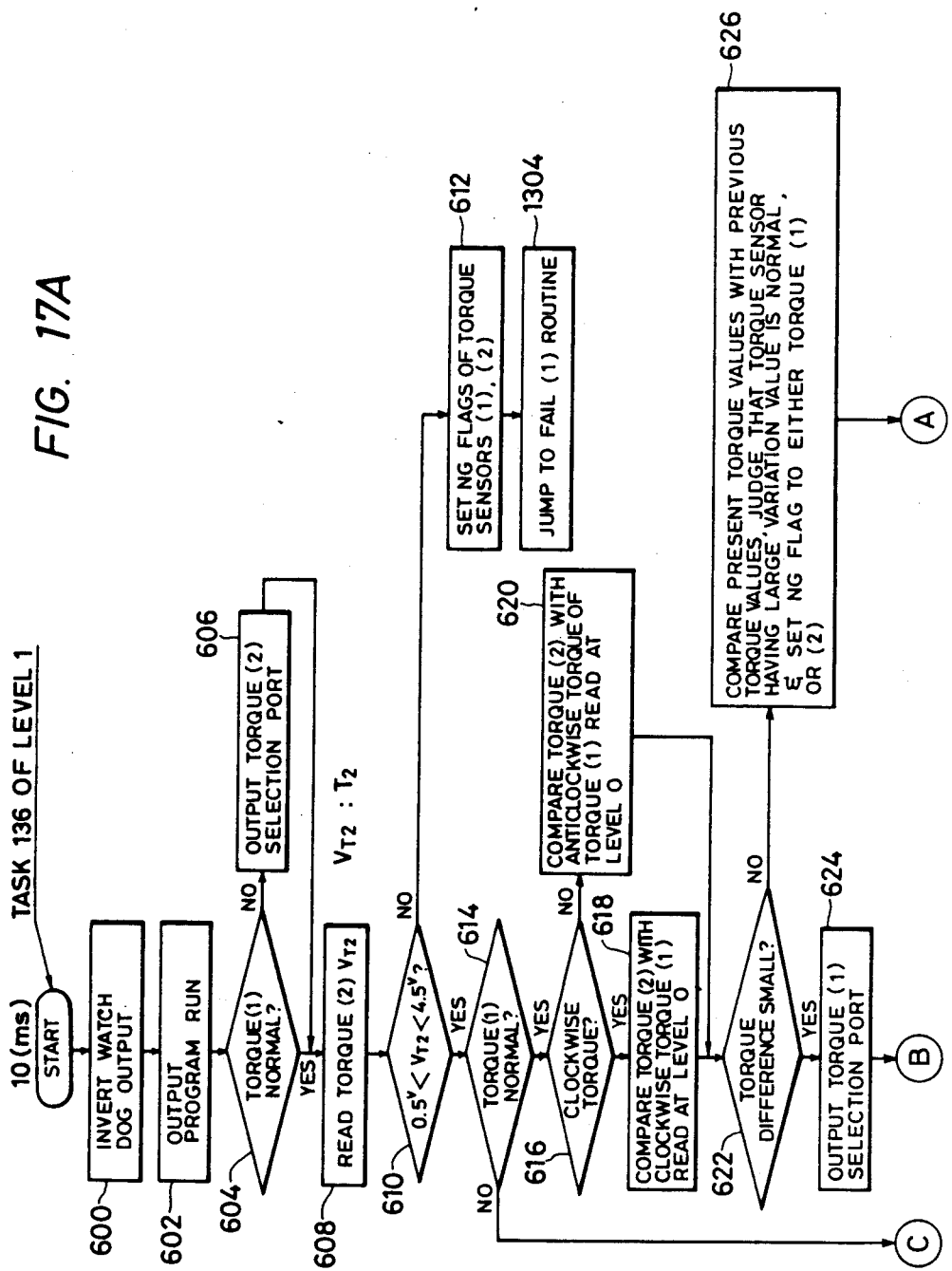

Next, the processing of the task 136 (FIG. 13) of the level 1 will be explained, referring to FIG. 17.

The task 136 is started at each 10 milliseconds as explained above. When the task is practiced, steps 600 and 602 are practiced to prevent the resetting of the micro computer. At this time, the output of the program RUN is output from the output port P10 of the micro computer 80.

At step 604, it is judged whether the torque (1) is normal or not by the existence of a NG flag. When the result of the step 604 is NO, the torque (2) is selected by step 606, whereby the output situation of the output port P1 is inverted.

A step 608, the signal $V_{T2}$ ($=T_2$) of the torque (2) is read from the analog input port $AN_3$. At next step 610, it is judged whether the voltage value of the signal $V_{T2}$ is within the range of 0.5 volts and 4.5 volts. When the result of the step 610 is NO, step 612 is carried out, then jumps to the processing of the fail (1) in FIG. 15, and finishes the task of the level 1. Namely, in the embodiment, when the torque sensors (1) and (2) are normal, it is supposed that the voltages $V_{T1}$ and $V_{T2}$ of the output of the torque sensors are within the range of 1-4 volts, because when the result of the step 610 is NO, it means that both torque sensors (1) and (2) are abnormal.

When the result of the step is YES, normality of the torque (1) is determined again at next step 614, then step 616 judges whether the signal $V_{T2}$ read at present is a clockwise torque or an anticlockwise torque. In the embodiment, since the signal $T_2$ ($=V_{T2}$) of the torque (2) has characteristic as shown in FIG. 5A, it can be easily judged whether the signal $V_{T2}$ is a clockwise torque or an anticlockwise torque by judging whether the signal $V_{T2}$ is smaller than 2.5 volts or not.

When the torque direction of the signal $V_{T2}$ is determined to be a clockwise torque, namely when the result of the step 616 is YES, step 618 is carried out, and a torque difference is obtained by comparing a clockwise torque of the torque (2) by the signal $V_{T2}$ and another clockwise torque of the torque (1) already read by the task 135 of the level 0. When the determination of the torque direction of the signal $V_{T2}$ is an anticlockwise torque, namely when the result of the step 616 is NO, step 620 is carried out to obtain a torque difference by comparing an anticlockwise torque of the torque (2) and another anticlockwise torque of the torque (1).

After that, in step 622, it is determined whether these torque differences maintain small values within a predetermined ones. When the result of the step 622 is YES, it is judged that both torque sensors (1) and (2) are normal, and next step 624 is carried out to maintain the signal of the output port PI in the state that the torque (1) is selected. Namely, the values of the torques (1) and (2) ought to have the same initial values. Accordingly, when the torque differences are small, it can be judged that both torque sensors (1) and (2) are normal in terms of probabilities, so that the selected state of the torque (1) can be maintained.

However, when the result of the step 622 is NO, it shows that differences are generated between the torque (1) and torque (2) initially ought to be same, and it is considered that either one of the torque sensors (1) and (2) is abnormal. At this time, the processing of the step 622 flows to step 626. At the step 626, judgment is taken place concerning whether either one of the torque sensors (1) and (2) is abnormal. The judging theory of the step 626 is as follows. Namely, the steering torque is an object which is normally changing. When the steering torque is detected not to be changed, it is judged that any trouble causes the result of the detection. Based on this assumption, it is judged that the torque sensor showing small variation value is abnormal.

On the other hand, when the result of the step 614 is NO, the processing of the step 616 or the step 628 is skipped, and the processing of the step 614 flows to next step 630A. The step 630A and 630B are used for selecting a correct torque data as follows: The total value of the two data of the two torque sensors should be a value between 4.5 volts and 5.5 volts. So, at step 630B, when the value is under 4.5 volts or over 5.5 volts, the step jumps to step 612. When the value is within the range, the step goes to the step 630A. The processings from the step 630A to step 640 are used for selecting either one of the input of the analog input port AN5 or AN7 as the steering angle velocity $\theta'_s$ which is used at the inertia compensation processing practiced at the step 534 or the step 548 in the task 135 (FIG. 16) of the level zero. These steps 630 to 640 are prepared for the necessity of changing over the two sensors corresponding to the steering angle, since the steering angle sensors of the embodiment can not detect the steering angle continuously by one sensor as explained in FIGS. 6A and 6B.

For that reason, the step 630 introduces the signal $V\theta_1$ from the analog input port $AN_4$, next step 632 determines whether the signal $V\theta_1$ is within the range of 1.5 volts to 3.5 volts. When the result of the step 632 is YES, it shows that the signal $V\theta_1$ is within the range showing the clockwise steering angle; and at step 634, a flag for selecting the steering angle (1) is set.

When the result of the step 632 is NO, the signal $V\theta_2$ is introduced from the input port AN6. Next, the step 638 judges whether the signal $V\theta_2$ is within the range of 1.5 volts to 3.5 volts. When the result of the step 638 is YES, the processing of the step 640 sets a flag for selecting the steering angle (2).

Incidentally, as apparent from the characteristics of FIGS. 6A and 6B, when both steering angle sensors (1) and (2) are normal, either one of the signal $V\theta_1$ or $V\theta_2$ is within the range of 1.5-3.5 volts. Accordingly, the result of the step 638 is considered to be YES. Then, when the result of the step 638 is NO, it is judged that either one of the steering angle sensor (1) or (2) is in trouble. At step 642, it is judged whether both signals $V\theta_1$ and $V\theta_2$ are larger than 0.5 volts. Next step 644 judges whether the signals $V\theta_1$ and $V\theta_2$ are less than 4.5 volts. When either one result of these step 642 or 644 is NO, the processing of the step 646 is carried out, and NG flag of the steering angle is set, whereby the inertia compensation is not given after that.

On the other hand, when the results of both steps 642 and 644 are YES, it is judged that a change of a transient phenomenon is generated at either one of the signal $V\theta_1$ or $V\theta_2$ of the steering angle sensor, but still any trouble does not appear to the steering angle sensor. At step 648, the steering angle selection flag is maintained as previously, and an abnormal judgment is carried out at the next step.

After the processing concerning the steering angle sensor is finished, the processing of these steps flow to step 650, and an abnormal judgment of the power element 814 is carried out based on the signals $V_{CE}(R)$ and $V_{CE}(L)$ introduced from the input ports P8 and P9. When an abnormality is detected, the step jumps to the fail (1) routine 1304. If an abnormality is not detected, the processing is finished.

Turning back to FIG. 13, the task 137 of the level 2 which is started at each 20 milliseconds, detects a temperature of two power transistors (corresponding to the transistors 9 and 10 in FIG. 18) disclosed in the power element 814. When the temperature is larger than a predetermined value, the current I supplied to the motor 5 decreases. For performing the function, the signal PTEMP from a temperature detecting element of a thermistor etc. fitted to a power transistor within the power element 814 is introduced to perform the processing.

The task 138 of the level 3 which is started at each 640 milliseconds introduces the data of the counter which is counted up in the IC interruption processing 133 calculates the vehicle speed as explained above. The vehicle speed data thus obtained is used for the above explained vehicle speed compensation and the like.

The present invention has two torque sensors 201 and 202 of the torques (1) and (2), supervises the function of the two torque sensors, and performs the function of the power steering by the detected signal of the torque sensor (1) as a general rule. When an abnormality is generated in the torque sensor (1), the performance of the power steering function is carried out by the torque sensor (2). Further, when both torque sensors are abnormal, the function of the power steering is stopped for the first time. Therefore, according to the embodiment sufficient back-up and high safety of the power steering function can be obtained.

According to the embodiment, the abnormal detection of the torque sensors is performed by judging whether the detected voltages are within a predetermined range; and when a difference occurs between the detected voltages of two sensors, it is decided that an abnormality is generated at a sensor in which a variation rate of the detected voltage is small. The invention then usually can perform the abnormal detection of the torque sensors safely.

Further, according to the disclosed embodiment, since the vehicle speed compensation and the inertia compensation are performed for controlling the auxiliary steering force, the steering wheel can be easily operated without adding extra force during acceleration or deceleration of the vehicle.

Although the above explained embodiment utilizes two torque sensors, the present invention is not limited to the embodiment. The present invention can continuously perform fully the function of the power steering even when more than three torque sensors are used, and a number one or more of the torque sensors encounters trouble.

What we claim is:

1. A motor-driven power steering apparatus for detecting a steering force transmitted to a steering mechanism of a driven wheel of a vehicle from a steering wheel, and for controlling an auxiliary steering force by a motor-driven actuator corresponding to the detected value of the steering force, comprising: two detectors for detecting said steering force; supervising and control means for detecting variations of signals outputted from said two detectors, for judging either one detector as being abnormal when showing a minimum variation in a detected voltage of one detector and another detector as being normal when not showing the minimum variation in a detected voltage of another detector based on the signals outputted from said detectors when each detector has a different variation, and for controlling said auxiliary steering force based on a first control value of a normal output signal from the normal detector; two circular type resistor sensors with detecting regions smaller than 360° and slits forming non-detecting regions such that output signals from said resistor sensors have respective delays of 180°, for detecting a revolution angle of said steering wheel; two differential circuits connected to said resistor sensors to differentiate the output signals of said resistor sensors; digital differential processing means connected to said differential circuits for further differentiating one of said differentiated output signals for obtaining a second control value indicative of a steering angle acceleration; and means for adding said first control value and said second control value to provide said auxiliary steering force.

* * * * *